United States Patent [19]
Carranza et al.

[11] Patent Number: 5,869,014
[45] Date of Patent: Feb. 9, 1999

[54] PROCESS FOR THE PRODUCTION OF PURIFIED, SYNTHETIC CALCIUM BORATE

[76] Inventors: Manuel Camarena Carranza, Privada Abelardo L. Rodriguez; Juan Manuel Cuevas Martinez, Galaxias 60; Luis Armando Blanco Huerta, Av. Punta Chueca 1259; Julio Enrique Wong Gaytan, Calpulli 137-A, all of Hermosillo, Mexico

[21] Appl. No.: 396,641

[22] Filed: Mar. 1, 1995

[51] Int. Cl.⁶ ............................ C01B 35/10; C01B 35/12
[52] U.S. Cl. ............................................ 423/280; 423/283
[58] Field of Search ..................................... 423/280, 283

[56] References Cited

U.S. PATENT DOCUMENTS

| | | | |
|---|---|---|---|
| 1,927,013 | 9/1933 | Cramer et al. | 423/283 |
| 1,927,014 | 9/1933 | Cramer et al. | 423/283 |
| 4,086,325 | 4/1978 | Cordier et al. | 423/280 |
| 4,270,944 | 6/1981 | Eastes et al. | 423/280 |
| 5,084,260 | 1/1992 | Bertocci et al. | 423/283 |
| 5,472,678 | 12/1995 | Nie et al. | 423/280 |

FOREIGN PATENT DOCUMENTS

| | | | |
|---|---|---|---|
| 2454409 | 5/1975 | Germany | 423/283 |
| 3029349 | 4/1981 | Germany | 423/283 |
| 25145 | 10/1968 | Japan | 423/283 |
| 1549919 | 3/1990 | Russian Federation | 423/283 |

*Primary Examiner*—Wayne Langel
*Attorney, Agent, or Firm*—John G. Costa

[57] ABSTRACT

A process for the production of calcium borate from boric acid; boric acid, obtained from any source, is reacted with a calcium compound, preferably calcium hydroxide, in an aqueous medium to obtain a suspension of solid calcium borate which is then separated from the residual liquor. Preferably the boric acid is prepared from minerals containing borate salts, in particular, colemanite and howlite; wherein said minerals are ground, reacted with sulfuric acid in an aqueous medium, at high temperature, to obtain a pulp of solids, including mainly gypsum and clay, in a liquor; said solids are eliminated from the liquor and boric acid is crystallized.

37 Claims, No Drawings

PROCESS FOR THE PRODUCTION OF PURIFIED, SYNTHETIC CALCIUM BORATE

FIELD OF THE INVENTION

The present invention refers to a process for the production of calcium borate from minerals containing borate salts or from boric acid. Calcium borate is used mainly in the production of glass fiber, which, in turn, is used mainly to strengthen materials and insulation.

BACKGROUND OF THE INVENTION

There are several prior processes for the preparation of calcium borate both from boric acid and from minerals, which contain borate salts, such as ulexite.

The specific treatment process, depends on the type of mineral used, its purity (impurity contents), and "grade" (percentage of borate contained in the minerals), as well as on the desired quality of calcium borate to be produced.

The basic process for the production of boric acid, as noted in the Kirk Othmer encyclopedia of Chemical Technology, 2nd edition, 1964,, vol. 3, page 615, starts from the reaction of colemanite with sulfuric acid.

A classic example for the formation of boron and calcium compounds from boric acid, cited in the Kirk Othmer encyclopedia of Chemical Technology, 2nd edition, 1964, vol. 3, page 649, makes reference to the formation of calcium-boron compounds ($CaO/B_2O_3$, molar ratio 1:3) by reacting boric acid and calcium acetate.

The most frequent examples of processes for the production of calcium borate are those which start with ulexite, ($Na_2O.2CaO.5B_2O_3.16H_2O$).

One such process is that disclosed by Eastes in U.S. Pat. No. 4,270,944, assigned to Owens Corning Fiberglass, wherein a high quality ulexite (from Borates of Peru, having an oxide composition of 6.9% $Na_2O$, 9.9% CaO and 41.8% $B_2O_3$) is primarily dissolved in hot hydrochloric acid to form a mixture containing undissolved solids. This mixture is filtered. Calcium chloride is added to the solution to replace all sodium in the ulexite. Said solution is neutralized with sodium hydroxide, at a pH of from 7 to 9, to form a white, calcium borate precipitate which is filtered, washed with water, and dried at 110° C. for 2 or 3 hours. This process yields a calcium borate containing from 46.7% to 49% $B_2O_3$.

Another recent example is the cyclic process for obtaining calcium borate and sodium borate as disclosed by Pepi in U.S. Pat. No. 5,268,154, assigned to Bitossi Dianella S.P.A. This process comprises the disaggregation of ulexite in a liquid containing $H_3BO_3$ and $Na_2O$ at a temperature of from 120° C. to 200° C., to form a suspension. Calcium borate, with the formula $4CaO.5B_2O_3.7H_2O$, is recovered from the suspension by hot filtration. Sodium borate dehydrate is crystallized from the remaining liquid, at a temperature of 30° C., and separated from the mother liquor. Sodium hydroxide is added to the mother liquor to maintain the weight ratio of $H_3BO_3/Na_2O$ between 1.8 and 2.7. The mother liquor with NaOH is recycled for use as part of the disaggregation liquid.

In U.S. Pat. No. 3,332,738, 1967, assigned to the U.S. Navy Department, Wieder et al disclosed a method for the production of synthetic colemanite in which sodium borate or boric acid are reacted with compounds such as $Ca(IO_3)_2$, $CaCl_2$, $Ca(C_2H_3O_2)_2$ for from 1 to 8 days.

Other patents for processes for the production of boric acid, include:

1. U.S. Pat. No. 2,020,570 issued to Solvay Et Cie, wherein calcined colemanite suspended in water is reacted with $CO_2$ in a reactor at a high pressure;
2. U.S. Pat. No. 4,196,177, wherein an alkaline borate is reacted with ammonia and ammonium sulfite in the presence of methanol.
3. U.S. Pat. No. 3,650,690 issued to Stauffer Chemical, wherein an alkaline borate is reacted with sulfuric acid, and subsequently, with overheated vapor, boric acid is vaporized and recovered.
4. Other patents disclose the attack of boron and calcium or boron and sodium minerals with the following reagents: hydrochloric acid (U.S. Pat. No. 2,855,276), phosphoric acid (British patent No 423,293), ammonium carbonate (Switzerland patent No. 354,760).
5. U.S. Pat. No. 2,089,406, assigned to Pacific Coast Borax Co. shows the production of boric acid from rasorite ($Na_2O.2B_2O_3.4H_2O$) with sulfuric acid; and
6. U.S. Pat. 3,103,412 assigned to Tholand, Inc., wherein the colemanite and/or howlite mineral is reacted with ammonium sulfate.

Additionally, as illustrated in the papers Bulltech University Istanbul, vol. 38, page 207–231, 1985; Journal of Colloid Science, vol. 13, page 386–396, Journal of Crystal Growth, vol. 20, pages 125–134, 1973, Can. J. Chem. vol. 36, pages 1057–1063, 1958, in the production boric acid, prior to the production of calcium borate, the proper formation of gypsum, which is one of the reaction products of colemanite with sulfuric acid, is of great importance.

As can be seen, the production of boric acid can be started from a variety of boron and calcium and/or boron and sodium minerals and/or compounds, using various agents and reaction conditions.

A bibliographic search found processes for beneficiating colemanite and /or howlite utilizing both mechanical methods, such as grinding, attrition and separation, and chemical methods, such as chemical reactions, solvent extraction or calcination. However, colemanite and/or howlite minerals that are contaminated with arsenic, iron, magnesium, strontium, silica, sulfates, among other contaminants are inappropriate for beneficiating where the compound of calcium-boron obtained remain in favorable conditions for an industrial use without damaging equipment and/or measurement systems.

Examples of processes for beneficiating colemanite and/or howlite, are represented by U.S. Pat Nos. 4,756,745, 4,756,894 and 4,804,524, issued to Polendo and assigned to Materias Primas Magdalena. In the first two, colemanite and/or howlite minerals are reacted firstly with sulfuric acid to form a solution from which the solids are removed as a gypsum cake and the remaining solution is reacted with sulfhydric acid ($H_2S$), to precipitate arsenic and iron impurities, to produce a beneficiated colemanite or boric acid, with a lower amount of impurities. These patents also disclose the possibility of producing calcium borate by reacting the beneficiated colemanite with $Ca(OH)_2$. In the second mentioned patent, after the arsenic and iron impurities are precipitated with $H_2S$, the remaining solution is reacted with $NH_3$, to precipitate aluminum impurities $Al(OH)_3$ and again with sulfuric acid to precipitate $(NH_4)_2SO_4$, to obtain boric acid.

Since these processes start with colemanite and/or howlite minerals of low purity (high impurity content) and low "grade" (low content of borate in such minerals), it has always been considered strictly necessary to precipitate and remove the arsenic, iron, and ammonium sulfate impurities, to get an industrially acceptable beneficiated colemanite or boric acid .

In this invention low purity and low grade colemanite and/or howlite minerals are utilized without treatment of the strong liquor with reagents such sulfhydric acid ($H_2S$) and ammonia ($NH_3$) to eliminate impurities.

BRIEF SUMMARY OF THE INVENTION

This invention discloses a process for the production of calcium borate from low purity and low "grade" colemanite and/or howlite minerals, contaminated with compounds such as gypsum ($CaSO_4 \cdot 2H_2O$), calcite ($CaCO_3$), celestite ($SrSO_4$), quartz ($SiO_2$), orthoclase ($KAlSi_3O_8$), etc., firstly, by reacting said minerals with sulfuric acid to form boric acid which is crystallized and then by reacting boric acid with calcium hydroxide in an aqueous medium, without intermediate beneficiating stages, to produce calcium borate. Contrary to what would be expected from existing methods, this new process is not only economically feasible, but, amazingly, also produces a calcium borate of high purity and high "grade".

DETAILED DESCRIPTION OF THE INVENTION

This invention refers to a process for the production of calcium borate from boric acid or from minerals containing calcium borate, in particular, colemanite and howlite. Unlike U.S. Pat. Nos. 4,804,524 and 4,756,894, issued to Polendo, and assigned to Materias Primas Magdalena, no treatment of the strong liquor with reagents such sulfhydric acid ($H_2S$) and ammonia ($NH_3$) to eliminate impurities is provided in this invention.

In general, prior to the process for the production of calcium borate, colemanite and/or howlite is subjected to a washing process wherein the level of contaminants, such as arsenic sulfide, calcium and strontium sulfate, calcium carbonate, as well as most of the clay contained in the hidden rock of the mineral, is reduced and boric acid is obtained.

In this washing process, mineral is ground to a particle size of 12.7 mm., then fed into a tank at a concentration of 65% solids and vigorously stirred. The pulp generated is screened through a 150 mesh. The fine fraction, constituting 35% by weight, is discarded. The washed colemanite and/or howlite, which is obtained in the gross fraction, is dried and ground to a particle size of 2 mm.

Screening through a 150 mesh clears the colemanite and/or howlite of impurities, increases the concentration of boron values, reduces the consumption of sulfuric acid, and reduces the filtration times.

However, this process for the production of calcium borate can also be initiated with raw mineral, such as colemanite and howlite, obtained from the mine, without the washing process.

The washed or raw mineral, such as colemanite and/or howlite, is reacted primarily with sulfuric acid, $H_2SO_4$, in a first reactor with stirring.

The main reactions carried out in the first reactor are:

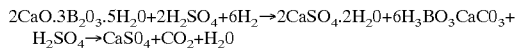

$$2CaO \cdot 3B_2O_3 \cdot 5H_2O + 2H_2SO_4 + 6H_2 \rightarrow 2CaSO_4 \cdot 2H_2O + 6H_3BO_3 CaCO_3 + H_2SO_4 \rightarrow CaSO_4 + CO_2 + H_2O$$

The consumption of sulfuric acid in the reactions may vary from 0.56 to 3.0 tons of $H_2SO_4$ per ton of $H_3BO_3$. The sulfuric acid used for the reaction is from 20 to 36 molar. The reaction temperature is from 80° C. to 100° C., and the reaction time is from 0.25 to 2.5 Hrs. This reaction yields a pulp of from 25 to 35% solids, mainly calcium sulfate, clay and other insoluble compounds, as well as boric acid in solution. Said pulp is filtered and washed with hot water, separating the insoluble material, the "gypsum mud", from the remaining liquor, the "strong liquor", which is deposited in a tank. This strong liquor contains from 10 to 18% boric acid by weight, in addition to the soluble contaminants and water.

The strong liquor obtained, has a pH of from 0.5 to 3.0, and contains from 0.1 to 4% free acid in the form of sulfuric acid, $H_2SO_4$ This strong liquor is cooled, at a temperature of up to 45° C. to obtain boric acid, $H_3BO_3$. The mixture obtained, containing boric acid, is then filtered, separating the boric acid from the remaining liquor, the "mother liquor". It should be noted that, at this stage, the boric acid obtained by cooling is usually crystallized. The boric acid is washed to eliminate impurities which would be adsorbed if the boric acid were dried. The mother liquor may be recycled to the first reactor, and the boric acid obtained is deposited into and stirred in a second reactor to form an aqueous solution of from 16 to 50% boric acid by weight. This aqueous solution is then reacted with a high grade calcium compound, such as calcium hydroxide, at a temperature of from 80° C. to 100° C. and a reaction time of from 1 to 3 hours to obtain calcium borate. In this invention, other calcium compounds, such as calcium oxide, calcium chloride, calcium acetate, calcium iodate, and calcium carbonate, can be used instead of calcium hydroxide. The calcium borate mixture obtained is filtered, separating calcium borate from the remaining liquor, called "liquor of borate". The calcium borate is filtered and washed in a filter and dried in a drier at 110° C., to obtain calcium borate. The liquor of borate may be recycled to the first reactor.

In this process the calcium borate produced is a compound comprising, by weight, from 48% to 61% boron oxide, from 19% to 31% calcium oxide, from 19% to 23% water and from 0% to 1% impurities.

PREFERRED EMBODIMENT

In the preferred embodiment of this invention, colemanite and/or howlite ore is stirred in a first reactor with sulfuric acid and recycled liquors at a temperature of 95° C. to yield a pulp which is filtered and washed with hot water (95° C.), separating the insoluble material, the "gypsum mud", from the remaining liquor, the "strong liquor". The strong liquor is deposited in a tank. This strong liquor is cooled in a vacuum, at a temperature of up to 30° C., in a crystallizer to obtain boric acid crystals, $H_3BO_3$ The mixture obtained is filtered to separate boric acid crystals from the remaining liquor, the "mother liquor". The boric acid crystals are filtered and washed in a filter. The mother liquor, is recycled to the first reactor, and the boric acid crystals obtained are deposited into and stirred in a second reactor to form an aqueous solution of 35% boric acid by weight. This aqueous solution is then reacted with a high grade of calcium hydroxide, in a ratio of five (5) parts boric acid to one (1) part lime by weight, or a molar ratio of six moles boron to one mole calcium, at a temperature of 90° C. and a reaction time of from 1 to 3 hours to obtain a mixture containing calcium borate, said calcium borate having the formula $CaO \cdot 3B_2O_3 \cdot 5H_2O$. The mixture containing calcium borate is filtered, separating the calcium borate from the remaining liquor, the "liquor of borate". The calcium borate is washed in a filter and dried in a drier at 110° C., to obtain a calcium borate with the formula $CaO \cdot 3B_2O_3 \cdot 4H_2O$, which contains from 60–61% $B_2O_3$. At drying temperatures of from 140° to 800° C., it is possible to obtain calcium borate with even lower water content. The liquor of borate has a pH from 6 to 7 and is recycled to the first reactor.

In the preferred embodiment, the weight of the calcium compound used will be determined such that the molar ratio of six moles boron to one mole calcium is maintained.

Utilizing this process an unusually pure calcium borate compound, comprising, by weight, about 61% boron oxide, about 18.5% calcium oxide, about 20% water and about 0.5% impurities, has been obtained.

EXAMPLES

Following are some examples of the process which were carried out in the laboratory and the pilot plant of Materias Primas Magdalena, S.A. de C.V.

Example 1

10 grams of colemanite and/or howlite mineral containing 39% of $B_2O_3$ were mixed with 60 grams of recycled liquor ($H_3BO_3$=5.8%) at a temperature of 95° C. and reacted with 2 grams of 100% sulfuric acid for 2 hours at said temperature. The gypsum cake is washed and filtered and a strong liquor of 16% boric acid obtained. The temperature was lowered from 95° to 30° C., obtaining boric acid crystals, which were separated by filtration from the mother liquor. The mother liquor was recycled. After washing these crystals, they are mixed with 6.9 grams of water at 95° C., and reacted with 2.5 grams of calcium oxide, in the form of calcium hydroxide at from 95° C. to 100° C., and allowed to react for 3 hours. The product is filtered and washed, the borate liquor is recycled and the calcium borate is dried at 110° C.

Analysis indicates:

$B_2O_3$=46%; CaO=30%; L.O.I.=24%

Product analysis of the main stages are as follows:

| PRODUCT | Weight (g) | % $B_2O_3$ | % DISTR. $B_2O_3$ |
|---|---|---|---|
| MINERAL | 10.0 | 39.0 | |
| RECYCLED LIQUOR | 60.0 | 3.9 | 100.0 |
| STRONG LIQUOR | 60.0 | 9.0 | |
| GYPSUM CAKE | 10.0 | 1.2 | 2.0 |
| BORIC ACID | 3.7 | 56.2 | |
| MOTHER LIQUOR | 54.0 | 3.3 | 30.3 |
| BORATE LIQUOR | 15.0 | 3.6 | 9.2 |
| CALCIUM BORATE | 7.4 | 46.0 | 57.9 |

Example 2

2 Kilograms of colemanite and/or howlite mineral containing 14% $B_2O_3$ are added to 4.8 Kilograms of recycled liquor at a temperature of 95° C. This is reacted with 0.53 Kilograms of 100% sulfuric acid for 2 hours; the pH of this mixture is 1.5. The gypsum cake is filtered and washed, wet weight 2.5 Kg. (drying at 50° C.). The strong liquor is subjected to vacuum crystallization (17% of evaporated water), decreasing the temperature from 95° C. to 30° C., the magma obtained is filtered and washed, the mother liquor is recycled, obtaining in this way 0.49 Kg. of boric acid, which is then mixed with 0.92 Kg. of water at 95° C. and lastly the boric acid is reacted with 0.098 Kg. of industrial calcium hydroxide to a temperature from 95 to 100° C. for 3 hours. The reaction pH is of 6.4. After filtration and washing with water at 90° C., a borate liquor is obtained, which is recycled, the calcium borate is dried at 110° C., obtaining a weight of 0.415 Kg.

Both the boric acid ($H_3BO_3$), as well as the calcium borate ($CaO.3B_2O_3.4H_2O$) were analyzed

| | $CaO.3B_2O_3.4H_2O$ | $H_3BO_3$ |
|---|---|---|
| % $B_2O_3$ | 61.0 | 56.200 |
| % CaO | 18.0 | 0.005 |
| % $H_2O$ | 20.1 | <0.100 |
| ppm As | <1 | <1 |
| % $Fe_2O_3$ | 0.06 | 0.010 |
| % $SO_3$ | 0.29 | <0.010 |
| % $SiO_2$ | 0.30 | <0.010 |
| % MgO | 0.06 | 0.008 |
| δ | 2.10 | 1.480 |

| PRODUCT | AMOUNT (kg) | % $B_2O_3$ | % DIST. $B_2O_3$ |
|---|---|---|---|
| MINERAL | 2.000 | 14.0 | |
| RECYCLED LIQUOR | 4.800 | 3.7 | 100.00 |
| GYPSUM CAKE | 1.900 | 1.2 | 5.00 |
| STRONG LIQUOR | 4.800 | 9.0 | |
| BORIC ACID | 0.490 | 56.3 | |
| MOTHER LIQUOR | 3.400 | 3.8 | 28.20 |
| BORATE LIQUOR | 1.350 | 3.8 | 11.20 |
| CALCIUM BORATE | 0.415 | 61.0 | 55.32 |

Example 3

10 grams of colemanite and/or howlite containing 15% $B_2O_3$ were mixed with 30 g. of recycled liquor containing 3.7% boric acid, at 95° C., and reacted, with continuous stirring with 3 g. of sulfuric acid, at 95° C., for 2 hours at a pH of 1.5.

The resultant pulp is filtered and washed with water at 95° C. A wet cake of 13 grams and 30 grams of strong liquor at a pH of 1.8 were obtained. This is crystallized, condensing 8 g. of water and decreasing the temperature from 95° C. to 30° C. The pulp of boric acid is washed and filtered, obtaining 18.7 grams of mother liquor. The wet boric acid is of 4.1 g., after dried is mixed with 4.94 g. of water at 95° C., 2.66 g. calcium hydroxide were added and reacted at 95° C. to 100° C. for 2 hours, and then filtered and washed with water at 95° C. obtaining 3 g. of borate liquor and 9.42 grams of a wet calcium borate, which is dried to 110° C., showing in analysis:

$B_2O_3$=36%; CaO=39%; L.O.I.=25%

| PRODUCT | AMOUNT (g) | % $B_2O_3$ | % DISTR. $B_2O_3$ |
|---|---|---|---|
| COLEMANITE | 10.0 | 15.0 | |
| RECYCLED LIQUOR | 30.0 | 2.10 | 100.00 |
| GYPSUM CAKE | 10.00 | 0.80 | 3.75 |
| STRONGLIQUOR | 30.00 | 7.10 | |
| BORIC ACID | 2.66 | 56.30 | |
| CALCIUM BORATE | 3.95 | 36.00 | 66.70 |
| BORATE LIQUOR | 3.00 | 0.10 | 0.14 |
| MOTHER LIQUOR | 18.70 | 3.35 | 29.40 |

Example 4

506 grams of $H_2O$ and 31 grams of boric acid (reactive grade) were mixed at 85° C. 200 grams of colemanite and/or howlite containing 17.4% $B_2O_3$ was added to the mixture and then reacted with 63 grams of 100% sulfuric acid for 2 hours, at 90° C. to 95° C., at a pH of 2.3. The resultant pulp is filtered and washed with water at 95° C., a wet gypsum cake of 288 g. and a strong liquor of 17.8% of $H_3BO_3$ with a weight of 600 g. were obtained This liquor, with a free acidity of 0.08% as sulfuric acid, is vacuum evaporated to condense 295 g. of water. The resulting liquor, containing 35% boric acid, is reacted with 21.3 g. of a high purity calcium hydroxide at a temperature of from 95° C. to 100° C. for 2 hours. The resultant mixture is filtered and washed with hot water at a temperature of 95° C., obtaining 230 g. of a liquor of borate and a wet solid of a yellow-orange color, with a weight of 140 g., this was dried at 110° C.

| COMPOUND | Weight (g) | % $B_2O_3$ | % DISTR. $B_2O_3$ |
|---|---|---|---|
| MINERAL | 200.0 | 17.40 | |
| SYNTHETIC LIQUOR | 537.0 | 3.25 | 100.0 |
| GYPSUM CAKE | 201.0 | 1.80 | 6.9 |
| STRONG LIQUOR | 600.0 | 10.00 | |
| BORATE LIQUOR | 230.0 | 3.50 | 15.4 |
| CALCIUM BORATE | 73.6 | 55.00 | 77.5 |

The chemical analysis of the main stages, is described emphasizing that from the strong liquor is deviated the borate liquor and the calcium borate.

| | $B_2O_3$ % | As ppm | $Fe_2O_3$ % | MgO % | $SO_3$ % | CaO % |
|---|---|---|---|---|---|---|
| MINERAL | 17.4 | 1921 | 3.090 | 5.04 | 7.58 | 21.800 |
| STRONG LIQUOR | 10.0 | 280 | 0.698 | 0.31 | 1.43 | 0.026 |
| CALCIUM BORATE | 55.0 | 2032 | 5.470 | 1.40 | 8.70 | 16.500 |
| BORATE LIQUOR | 3.5 | 80 | 0.068 | 0.36 | 0.95 | 0.100 |

In this example, a very contaminated calcium borate resulted from the addition of calcium hydroxide to a concentrated strong liquor (containing the boric acid). If boric acid crystals were separated from the mother liquor and then reacted with lime, a higher purity (low level of contaminants) calcium borate is obtained.

What is claimed is:

1. A process for the production of calcium borate from boric acid wherein said boric acid is, put into a solution of 30–40% boric acid by weight and reacted with a calcium compound in a molar ratio of about 6 moles boron to 1 mole calcium to obtain said calcium borate.

2. A process according to claim 1 wherein said solution is reacted with said calcium compound at a temperature of from 80° C. to 100° C. for a reaction time.

3. A process according to claim 1, wherein the reaction of the solution of boric acid with the calcium compound is carried out for from 1 to 3 hours.

4. A process according to claim 1 wherein said solution is reacted with said calcium compound at a temperature of about 90° C. for from 1 to 3 hours.

5. A process according to claim 1 wherein said solution is an aqueous solution.

6. A process according to claim 1 wherein said calcium compound is selected from at least one compound selected from the group consisting of calcium hydroxide, calcium oxide, calcium sulfate, calcium chloride, calcium acetate, the mixture of calcium acetate and sodium hydroxide, calcium iodate and calcium carbonate.

7. A process according to claim 1 wherein said calcium compound is calcium hydroxide.

8. A process according to claim 1 wherein said calcium compound is calcium oxide.

9. A process according to claim 1 wherein said calcium compound is calcium hydroxide and calcium oxide.

10. A process according to claim 1 wherein said solution is of 33–37% boric acid.

11. A process according to claim 1 wherein said solution is about 35% boric acid.

12. A process for the production of calcium borate from at least one mineral containing borate salt wherein said mineral is reacted with sulfuric acid at a reaction temperature, to obtain a pulp of solids and a first solution of boric acid; separating the pulp of solids from the first solution; crystallizing the boric acid from the first solution to obtain boric acid crystals; forming a second solution of 30–40% by weight of boric acid; and reacting the second solution of boric acid with a calcium compound in a molar ratio of about 6 moles of boron to 1 mole of calcium.

13. A process according to claim 12, wherein the reaction of the mineral with sulfuric acid is carried out by stirring.

14. A process according to claim 12, wherein the reaction of the mineral with sulfuric acid is carried out at a temperature from 90° C. to 100 ° C.

15. A process according to claim 12, wherein the reaction of the mineral with sulfuric acido is carried out at for from 0.25 to 2.5 hours.

16. A process according to claim 12, wherein the crystallization of the boric acid from the first solution is carried out by cooling to less than 45° C.

17. A process according to claim 12, wherein the crystallization of the boric acid from the first solution is carried out by cooling to about 30° C.

18. A process according to claim 12, wherein the crystallization of the boric acid from the first solution is carried out under vacuum conditions.

19. A process according to claim 12, wherein the reaction of the second solution with the calcium compound is carried out at a temperature of from 80° C. to 100° C.

20. A process according to claim 12, wherein the reaction of the second solution with the calcium compound is carried out for from 1 to 3 hours to obtain calcium borate.

21. A process according to claim 12 wherein said second solution is reacted with said calcium compound at a temperature of about 90° C. for from 1 to 3 hours.

22. A process according to claim 12 wherein the calcium orate obtained is filtered and dried at 110° C.

23. A process according to claim 12 wherein said sulfuric acid has a molar concentration of from 20 to 36.

24. A process according to claim 12 wherein said mineral is colemanite, howlite or a mixture of both.

25. A process according to claim 12 wherein said second solution is an aquous solution.

26. A process according to claim 12 wherein said calcium compound is at least one compound selected from the group consisting of calcium hydroxide, calcium oxide, calcium sulfate, calcium chloride, calcium acetate, the mixture of calcium acetate and sodium hydroxide, calcium iodate and calcium carbonate.

27. A process according to claim 12 wherein said calcium compound is calcium hydroxide.

28. A process according to claim 12 wherein said calcium compound is calcium oxide.

29. A process according to claim 12 wherein said calcium compound is calcium hydroxide and calcium oxide.

30. A process according to claim 12 wherein said second solution is of 33–37% boric acid.

31. A process according to claim 12 wherein said solution is about 35% boric acid.

32. A process according to claim 12 wherein boric acid is mixed with said at least one mineral containing borate salt prior to the reaction of said mineral containing borate salt with sulfuric acid.

33. A process for the production of calcium borate from a mixture of at least one compound selected from the group consisting of boric acid and a mineral containing borate salt, wherein said mixture is reacted with sulfuric acid at a reaction temperature to obtain a first solution of boric acid; forming a second solution of 30–40% boric acid by weight; and reacting the second solution with a calcium compound in a molar ratio of about 6 moles boron to 1 mole calcium.

34. A process according to claim 33 wherein said first solution comprises a pulp of solids.

35. A process according to claim 34 wherein said pulp of solids is separated from said first solution.

36. A process according to claim 33 wherein said first solution is crystallized to obtain boric acid crystals.

37. Calcium borate having the formula $CaO.3B_2O_3.4H_2O$ wherein said calcium borate is a compound comprising, by weight, about 61% boron oxide, about 18.5% calcium oxide, about 20% water and about 0.5% impurities.

\* \* \* \* \*